United States Patent [19]

Meiksin et al.

[11] Patent Number: 4,737,758

[45] Date of Patent: Apr. 12, 1988

[54] PERSONAL SECURITY AND ELECTRONIC PARKING SYSTEM

[75] Inventors: Zvi H. Meiksin; Melvin K. Fischman, both of Pittsburgh, Pa.

[73] Assignee: Parksafe, Inc., Pittsburgh, Pa.

[21] Appl. No.: 781,024

[22] Filed: Sep. 27, 1985

[51] Int. Cl.⁴ .............................................. G08G 1/14
[52] U.S. Cl. .................... 340/51; 340/539; 340/573; 364/467; 368/90
[58] Field of Search ................ 340/51, 573, 574, 539; 364/467; 368/90

[56] References Cited

U.S. PATENT DOCUMENTS

| | | | |
|---|---|---|---|
| 4,310,890 | 1/1982 | Trehn et al. | 340/51 |
| 4,383,242 | 5/1983 | Sassover et al. | 340/539 X |
| 4,524,178 | 6/1985 | Fulhorst | 340/63 |
| 4,611,198 | 9/1986 | Levinson et al. | 340/539 |
| 4,630,035 | 12/1986 | Stahl et al. | 340/539 |
| 4,630,289 | 12/1986 | Wren | 340/539 X |

Primary Examiner—Joseph A. Orsino, Jr.
Assistant Examiner—Jeffery A. Hofsass
Attorney, Agent, or Firm—Reed Smith Shaw & McClay

[57] ABSTRACT

The present invention provides an improved electronic parking system which has the capability of providing a relatively inexpensive personal security system to better protect patrons while in the parking garage. The invention provides increased protection through the use of a portable and convenient transmitter carried by a patron which activates a receiver-relay to summon help and activates horns and sirens to frighten away an attacker. The response of the system is immediate and does not depend on visual or auditory interpretation.

5 Claims, 3 Drawing Sheets

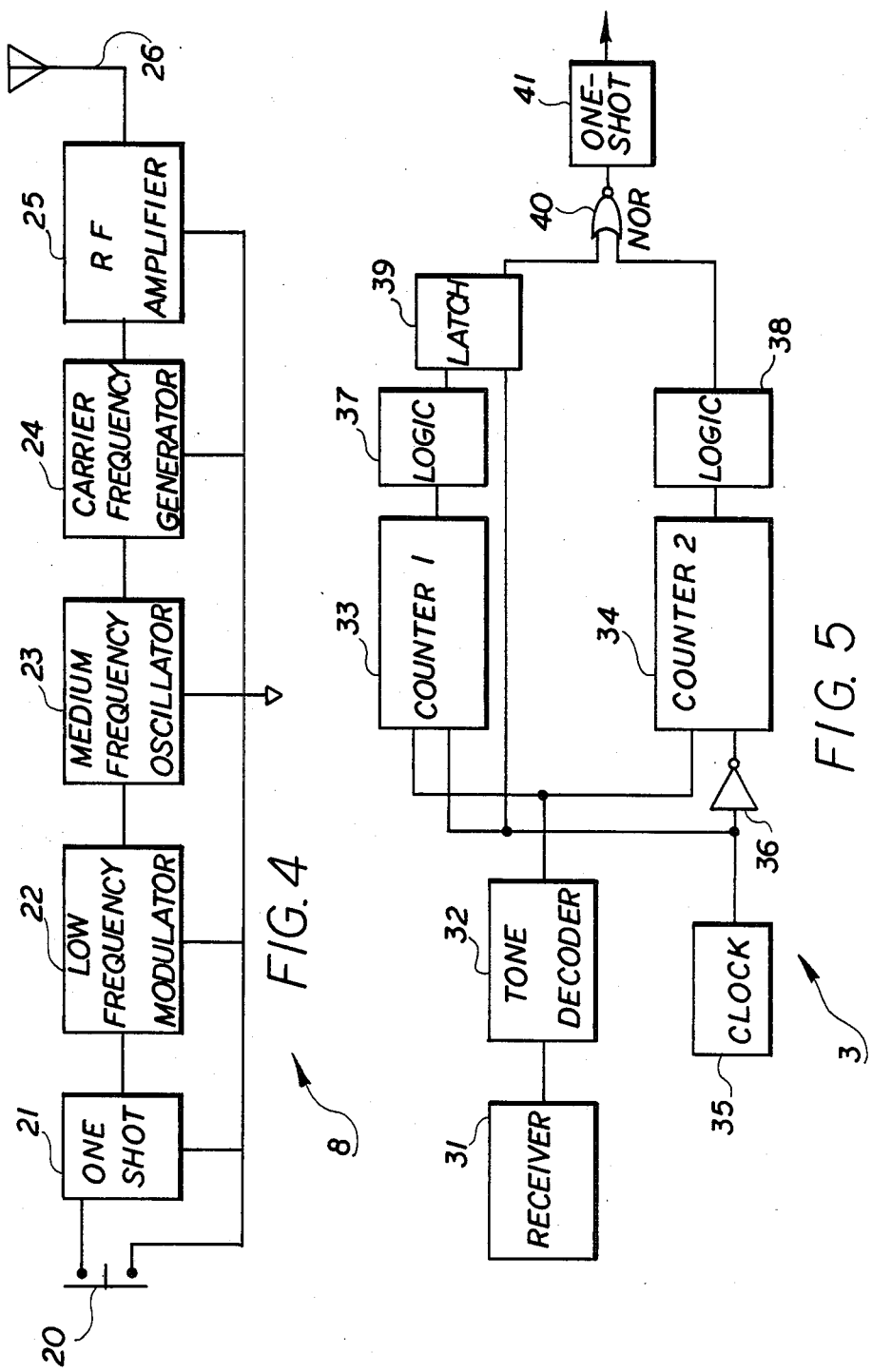

PERSONAL SECURITY AND ELECTRONIC PARKING SYSTEM

FIELD OF THE INVENTION

The present invention relates to an electronic parking system and, more specifically, to an electronic parking system combined with a personal security system.

BACKGROUND OF THE INVENTION

Patrons of public and private parking garages, such as the ones in shopping areas, hospitals, apartment buildings, office buildings, as well as other buildings, are subject to potential attacks, molestations and other physical and mental injury as a result of the lack of appropriate surveillance at these parking garages.

To increase the safety of patrons in parking garages, at least one governmental agency has legislated that garage owners are required to either install closed loop surveillance TV cameras or have a guard make eye contact with every location in the parking garage once every half hour. Neither of these proposals is a satisfactory solution to the problem of providing adequate personal security.

The installation of TV cameras is, by far, too costly. More importantly, TV camera surveillance is normally unsatisfactory because the locations where assaults and other incidents are likely to take place, such as between parked cars, are hidden from the cameras' view.

The second proposal of having a guard make eye contact with all locations once every half hour is also unsatisfactory because an assault can take place any time between surveillance rounds. Watching all locations at all times would require a large number of guards day after day and year after year resulting in prohibitive costs.

Another type of security system is an electronic patrol system. This system functions very much like an intercom, but automatically sends sounds to a listener at a station when a threshold decibel level is reached. The disadvantage of this system is that any loud noise may trigger the system, such as car horns, dogs barking or radios. A further disadvantage is that the listener must determine from the sounds whether assistance is necessary. Serious consequences could result if the listener incorrectly determines that no assistance is required when in fact it is. Finally, the patron may be unable to scream and activate the system because the attacker has prevented it. Or, if the patron can scream, the attacker could respond and mislead the listener.

Accordingly, it is an object of the present invention to provide a reliable and relatively low cost personal security system for a parking garage which affords greater personal security than is presently available. It is a further object of the invention to provide a security system which is easy for the patron to use and for the garage owner to respond to the case of an emergency.

SUMMARY OF THE INVENTION

Generally, the present invention provides an improved electronic parking system which has the capability of providing a relatively inexpensive personal security system to better protect patrons while in the parking garage. The invention provides increased protection over other prior methods through the use of a portable and convenient means to frighten away an attacker and to summon assistance immediately. Each patron is given a means of summoning help at all times in all locations throughout the parking garage by the use of a device. Unlike other personal security systems, the response is immediate and does not depend on visual or auditory interpretation.

Upon entry into the garage, a patron is given a pocket-sized transmitter to carry. Receiver-relays are installed throughout the parking garage. When approached by an attacker or when assistance is needed, the patron can activate the transmitter which activates the nearest receiver-relay to cause warning systems in the immediate vicinity to be activated. At the same time, the receiver-relay sends a signal to a central monitoring station in the parking garage to activate a sound and turns on a light identifying the receiver which sent the signal, thus, pinpointing the location where assistance is needed. An attendant alerted by the sound from the central monitoring panel can then dispatch help or hurry himself to provide the necessary assistance.

In addition to the security features, the transmitter can also function to provide the patron's time of arrival and to automatically tally the amount of the tariff in a public facility. Other advantages will become apparent from a perusal of the following detailed description of a presently preferred embodiment of the invention taken in connection with the accompanying drawings.

BRIEF DESCRIPTION OF THE DRAWINGS

FIG. 4 is a block diagram of the transmitter portion of the transmitter-timer.

FIG. 5 is a block diagram of the receiver-relay.

DESCRIPTION OF THE PREFERRED EMBODIMENTS

Figure 1:
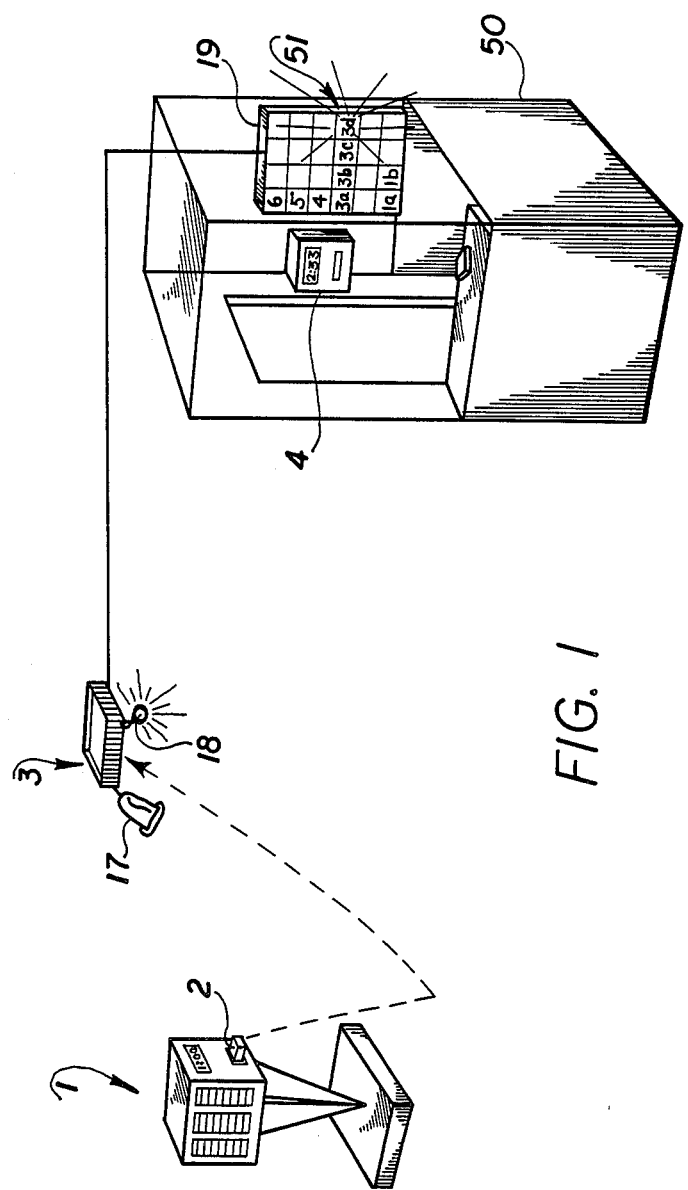
FIG. 1 is a diagrammatic illustration of the system according to the present invention.

The electronic parking and personal security system depicted in FIG. 1 combines an electronic parking system with a personal security system. The electronic parking system of FIG. 1 operates as follows: As a patron approaches the entrance gate of the parking garage, the patron or his automobile activates dispenser 1 which dispenses a transmitter-timer 2. Activation can be by means of a button, light beam sensor interrupt or pressure when the automobile rolls over a pressure sensor, all of which methods are currently used in parking garages. Preferably, transmitter-timer 2 is reuseable and is of the size of a thin hand held calculator and functions as the patron's parking ticket.

Figures 2, 3:
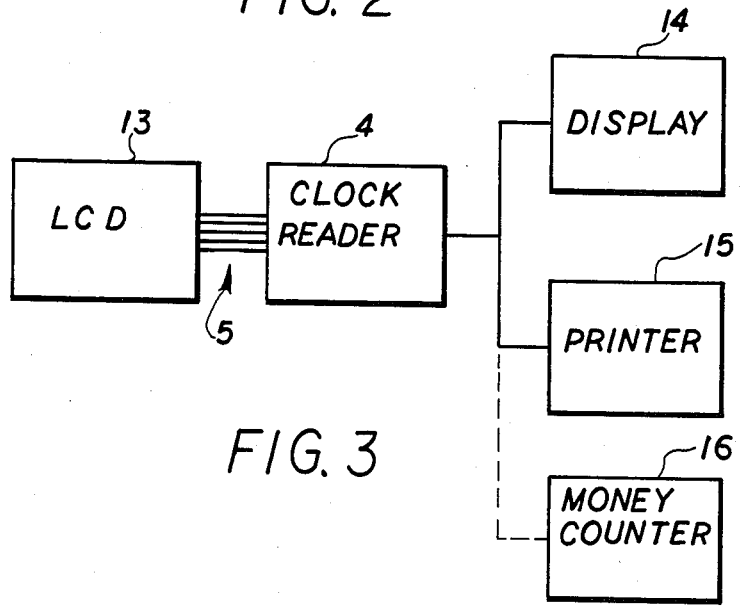
FIG. 2 is a block diagram showing the intraction of the clock in the transmitter dispenser with the timer portion of the transmitter-timer.
FIG. 3 is a block diagram showing the interaction of the clock-reader with the timer portion of the transmitter-timer.

Dispenser 1 can be almost any known dispenser capable of dispensing relatively thin plastic objects. Additionally, dispenser 1 has mounted in it a digital clock 10 which displays the data and time such as is shown in FIG. 2. This information is contained inside clock 10 in binary form. When a patron activates dispenser 1, the data and time information, in binary form, is transferred serially from clock 10 to transmitter-timer 2. This transfer occurs by means of magnetic coupling 9.

As shown in FIG. 2, the data and time information transferred by magnetic coupling to transmitter-timer 2 is applied to a serial/parallel converter 11 which activates a decoder driver 12 transforming the data and time information into a form which can be displayed on a liquid crystal (LC) display 13. When new information is transferred to transmitter-timer 2, any old information previously in LC display 13 is erased or written over. Alternatively, the old information can be erased when transmitter-timer 2 is inserted into the clock-reader 4 as discussed below. In the preferred embodiment, this erasure occurs only after the information has been read by clock-reader 4. The date and time that are fixed on the LC display can easily be read by the patron when transmitter-timer 2 from dispenser 1 is received. The transmitter-timer is not dispensed until the new date and time information has been transferred.

After transmitter-timer 2 displaying the date and time is dispensed to the patron, the parking gate opens and the patron parks his car and goes about his business. If no incident or other situation where the patron requires assistance has occurred, patron retrieves his car and upon leaving hands transmitter-timer 2 to the parking attendant at the exit gate. The attendant inserts transmitter-timer 2 into a slot in a clock-reader 4 shown in FIGS. 1 and 3 for calculating the parking fee or is inserted into a similar reader by the patron to activate an exit gate.

Clock-reader 4, as shown in FIG. 3, reads the date and time displayed by LC display 13 of transmitter-timer 2 through optical fibers 5. Clock-reader 4 has its own clock and subtracts the date and time read from transmitter-timer 2 from the present date and time on its clock to obtain the elapsed time the patron has parked. Clock-reader 4 then computes the correct parking fee and exhibits to the patron the amount due on display 14. The patron pays the amount due and receives a printout of the transaction from printer 15. Thereafter, the exit gate opens and the patron exits the parking garage. The parking attendant retains transmitter-timer 2 which can be reused by placing it back in dispenser 1.

Alternatively, the parking and personal security system can be further automated to eliminate the need for an attendant at the exit. Instead of an attendant, there is a money counter 16 connected to clock-reader 4, display 14 and printer 15. Clockreader 4 reads and displays the fee due. The patron drops the exact change into money counter 16. When the money in money counter 16 equals that on display 14, a receipt is dispensed by printer 15 and the exit gate opens allowing the patron to leave.

Money counter 16 can be any known device for this purpose, such as those in use at toll gates on highways or those used in vending machines. To enable the patron to deposit the exact change, a standard money-changing machine, such as is used in the vending machine industry, will be placed at the exit. Alternatively, this money-changing machine can be located elsewhere in the garage.

In another embodiment, the money-changing machine can be incorporated into money counter 16 so that when the patron deposits his money, the machine dispenses the correct change. Such change counting and dispensing devices are commonly known in the vending machine industry.

If, while the patron is on the parking garage premises, an incident is possibly about to occur or other situation where the patron needs immediate assistance, the patron can press recessed button 20 on transmitter-timer 2 which activates a receiver-relay 3, several of which are installed strategically within the parking garage. Preferably, several receiver-relays 3 are mounted with protective cages on the ceiling of each floor of the parking garage.

Receiver-relay 3 after decoding the signal from transmitter-timer 2 activates several warning systems in the parking garage including loud, raucous, piezo horns 17 and flashing strobe lights 18 which are designed to deter any thief or attacker. Receiver-relay 3 also sends a signal to monitoring panel 19 in the attendant's booth 50 which audibly alerts him as to which receiver-relay was activated 51 and, thus, the floor and section of the floor of the parking garage where help is needed. The attendant can then call an armed guard with a two-way radio, who immediately proceeds to the victim's aid. If the victim is escaping the attacker, different receiver-relays will be activated as the potential victim in possession of transmitter-timer 2 approaches them, thus, tracing out the escape path and helping the guard to locate the patron and the attacker.

Receiver-relay 3 can be hard wired to monitoring panel 19 by separate signal carriers, or the receiver-relay signal can be superimposed onto the existing power lines in the parking garage using known high-frequency techniques. If more than one receiver-relay 3 is activated by transmitter-timer 2, the receiver-relay which received the strongest signal from transmitter-timer 2 will be displayed on the monitoring panel.

While the transmitter portion 8 of transmitter-timer 2 and receiver 31 may interlock using the conventional FSK (frequency shift keying) technique to separate the signal from other spurious signals and prevent false alarms, a different, improved technique is preferred. In a preferred embodiment, transmitter 8 transmits a high-frequency carrier signal f3. The carrier signal is modulated by a medium-frequency signal f2 which itself is modulated by a low-frequency signal f3.

By referring to FIG. 4, the components which make up transmitter 8 can be seen. When the recessed button 20 on transmitter-timer 2 is pressed, a one-shot trigger 21 is activated for a predetermined amount of time even though recessed button 20 is released. One-shot 21 then outputs a logic 1. One-shot 21 is designed so that it turns off (i.e., the output goes to logic 0) after a predetermined time limit. The time one-shot 21 remains on can be varied, but in a preferred embodiment, the predetermined time limit is 5 minutes. In one embodiment, the on-time period of one-shot 21 can be overridden by depressing a reset key which causes one-shot 21 to turn off.

The output of one-shot 21 is modulated by a low-frequency modulator 22 (0.5 Hz-10 Hz) which in turn activates and deactivates a medium-frequency oscillator 23 (8 KHz-10 KHz). Medium-frequency oscillator 23 modulates a carrier oscillator 24. The composite modulated signal is amplified by an RF amplifier 25 and transmitted by antenna 26 to receiver-relay 3. In a preferred embodiment, low-frequency modulator 22 operates at a frequency $f1 = 8$ Hz, medium-frequency oscillator operates at a frequency $f2 = 10$ KHz, and carrier frequency oscillator operates at frequency of $f3 = 27$ MHz or $f3 = 270$ MHz.

Transmitter-timer 2 can also generate an audible sound 7 helping the guard to pinpoint the location of the patron while, at the same time, helping to deter the attacker from action. Additionally, the audible sound verifies to the potential victim that transmitter 8 has been and still is activated. Additionally, transmitter-timer 2 can have a display, such as a light 18, which turns on and remains on once the transmitter has been activated to indicate which transmitter-timer 2 has been activated. This is used to deter abuse of the device.

In receiver-relay 3, the incoming signal is demodulated and decoded using separately—or in combination—filters, decoders, and/or counters. A preferred embodiment of receiver-relay 3 is shown in FIG. 5. It consists of a receiver 31 containing a standard RF tuned circuit, a tone decoder 32, two counters 33 and 34, a clock 35, a latch 39, a second one-shot 41, and assorted logic circuitry 37, 38, and 40. Logic circuitry 37, 38, and 40 readies the alarm system and ensures that the alarm system is triggered only under the conditions as described below. In this embodiment, f3 is filtered through a tuned circuit in receiver 31, f2 is decoded by a tone decoder 32, and f1 is identified by a counter 33 and verified by counter 34.

More specifically, receiver 31 receives only the signal to which it is tuned which, of course, is the carrier frequency f3. Tone decoder 32 extracts the medium-frequency modulating signal f2 and generates an output signal if and only if and only as long as it sees a signal of the medium frequency f2. Since the medium frequency signal is turned on and off by transmitter-timer 2 at the low frequency f1, the output of tone decoder 32 is a square-wave signal of frequency f1.

To further increase the reliability of the system, receiver-relay 3 can be designed so that the signal must be decoded and identified twice (or more times) in succession before it activates the warning systems. This method offers very high reliability and extra immunity to false alarms. To do this, the output of tone decoder 32 is fed into two separate counters 33 and 34. Counters 33 and 34 are reset by a clock 35 which produces a 1.5 second pulse every 3 seconds. The output pulses from tone decoder 32 are counted by counter 33 for a time period of T/2, where T is the period of clock 35. If counter 33 counts n pulses, the counter via a logic circuit 37 sets a latch 39 which applies a 0 signal to a NOR gate 40. The value of n is set depending upon the value of the low-frequency signal f1. For a low-frequency signal of f1=8 Hz, counter 33 will count 12 pulses.

During the following T/2 time period, counter 34 which receives the inverted output of clock 35 will be counting pulses. If the number of pulses received is n, a 0 signal is applied by counter 34 via logic circuit 38 to the second input of NOR gate 40. Only when both inputs into NOR gate 40 are 0 will the output of the NOR be a 1. NOR gate 40 when the output is a 1 activates a second one-shot 41 which can then be used to activate the alarm, horns, monitoring panel, and the other circuitry of the warning systems. Typically, second one-shot 41 is used to activate a switch, such as a triac which completes an a.c. circuit which includes the strobe light, the power supply to the horns and the monitoring panel signal. Receiver-relay 3 will continue to activate the warning system and send a signal to the central control and monitoring room until deliberately deactivated by a guard or other authorized person.

While presently preferred embodiments of the invention have been described in particularity in connection with the drawings, the invention may be otherwise embodied within the scope of the appended claims. Particularly, it is evident that the personal security system of this invention can be adapted to serve patrons of apartment buildings, office buildings, parking lots, amusement and recreation parks, subway and train systems, indoor shopping centers and even business and residential streets.

What is claimed is:

1. A combined personal security and electronic parking system comprising:
    a. a portable transmitter-timer means for sending a signal when assistance is required, and for storing and displaying a time and a date when a patron enters the parking system;
    b. a dispenser means for dispensing the transmitter-timer to a patron and including a clock means for keeping track of date and time information and for transferring the information to the transmitter-timer when a patron enters the parking system;
    c. a plurality of receiver-relay means one or more of which may receive said signal from said transmitter-timer means and decode said signal;
    d. a plurality of warning systems adapted to be activated individually by said decoded signals;
    e. a monitor for receiving said decoded signals and identifying the receiver-relay means which received the strongest signal from the portable transmitter-timer means so that assistance can be sent to the proper location; and
    f. a clock-reader means for reading information from the transmitter-timer means, calculating an elapsed time since a patron entered and calculating a parking fee.

2. The system described in claim 1, including a clock-reader for reading and calculating the elapsed time between dispensing of said transmitter-timer means and reading by said reader.

3. The system described in claim 1, wherein said transmitter-timer comprises a one-shot trigger means, a low frequency modulator controlled by said trigger, a medium frequency oscillator, a carrier frequency signal generator modulated by said oscillator, an amplifier to amplify the carrier frequency signal and an antenna for transmitting said signals.

4. The system as described in claim 3, wherein the transmitter-timer receives data and time information from the dispenser which is displayed in a visual display.

5. The system as described in claim 4, wherein the receiver-relay comprises a receiver for receiving and decoding said carrier frequency signal, a tone decoder for extracting said medium frequency and a pair of counters for extracting the low frequency such that the warning systems are activated only if both counters have counted the same number of pulses.

* * * * *

UNITED STATES PATENT AND TRADEMARK OFFICE
CERTIFICATE OF CORRECTION

PATENT NO. : 4,737,758

DATED : April 12, 1988

INVENTOR(S) : Meiksin et al.

It is certified that error appears in the above—identified patent and that said Letters Patent is hereby corrected as shown below:

Column 1, line 54: please change --respond to-- to "respond in".

Column 2, line 29: please delete --intraction-- and substitute "interaction" therefor.

Column 2, line 56: please delete --data-- and substitute "date" therefor.

Column 2, line 59: please delete --data-- and substitute "date" therefor.

Column 2, line 62: please delete --data-- and substitute "date" therefor.

Column 2, line 65: please delete --data-- and substitute "date" therefor.

Column 3, line 42: please delete --Clockreader-- and substitute "Clock-reader" therefor.

Column 4, line 59: please insert "a" after "at".

Column 5, line 50: please delete --the-- after "and".

UNITED STATES PATENT AND TRADEMARK OFFICE
CERTIFICATE OF CORRECTION

PATENT NO. : 4,737,758

DATED : April 12, 1988

INVENTOR(S) : Meiksin et al.

It is certified that error appears in the above—identified patent and that said Letters Patent is hereby corrected as shown below:

Column 6, line 49: please delete --data-- and substitute "date" therefor.

Signed and Sealed this

Eighteenth Day of October, 1988

Attest:

DONALD J. QUIGG

Attesting Officer      Commissioner of Patents and Trademarks